United States Patent [19]
Flood et al.

[11] Patent Number: 6,134,047
[45] Date of Patent: Oct. 17, 2000

[54] OPTICAL AMPLIFIER DESIGNS FOR MULTICHANNEL FIBER OPTIC COMMUNICATION NETWORKS

[75] Inventors: Felton A. Flood, Corning, N.Y.; David Jacob, Avon, France; Mark F. Krol; Edward F. Murphy, both of Painted Post, N.Y.; Peter G. Wigley, Corning, N.Y.

[73] Assignee: Corning Incorporated, Corning, N.Y.

[21] Appl. No.: 09/055,332

[22] Filed: Apr. 6, 1998

Related U.S. Application Data

[60] Provisional application No. 60/075,325, Feb. 20, 1998.

[51] Int. Cl.[7] .............................. G02B 6/28; H04B 10/00; H01S 3/067
[52] U.S. Cl. ......................... 359/341; 359/174; 359/337
[58] Field of Search .................................... 359/130, 134, 359/179, 174, 337, 341

[56] References Cited

U.S. PATENT DOCUMENTS 5,422,968  6/1995  Hanatani et al. .......................... 385/24
5,886,803  3/1999  Yamamoto et al. ..................... 359/152

FOREIGN PATENT DOCUMENTS 2233526  8/1999  Canada .

OTHER PUBLICATIONS

Jacob et al, Proc. 1998 Opt. Fiber Commun. Conf., pp. 36–38, Feb. 27, 1998.
Eliseen et al, Faucet Physics, Lebedchen Lost. Reports, No. 51, pp. 1–4, 1990.
Lue et al, Laviet Lightwave Commun., vol. 2, #3, pp. 229–230, Aug. 1992.
Wysochi et al, Four of Lightwave Tech., vol. 14, #4, pp. 572–584, Apr. 1996.

*Primary Examiner*—Nelson Moskowitz
*Attorney, Agent, or Firm*—William Greener; Svetlana Short

[57] ABSTRACT

A multichannel fiber optic communication network incorporates multichannel fiber optical amplifiers having different functions but designed to use substantially identical gain flattening filters. This is achieved by designing the amplifiers to have total insertion losses such that their respective internal gains (internal gain=net gain+total insertion loss) are substantially the same, most preferably within 1 dB.

29 Claims, 6 Drawing Sheets

OPTICAL AMPLIFIER DESIGNS FOR MULTICHANNEL FIBER OPTIC COMMUNICATION NETWORKS

This application claims the benefit of Provisional No. 60/075,325 filed Feb. 20, 1998.

CROSS-REFERENCE TO RELATED APPLICATION

This application claims the benefit of priority under 35 U.S.C. § 120 of U.S. Provisional Application, Ser. No. 60/075,325, filed Feb. 20, 1998, entitled OPTICAL AMPLIFIER DESIGNS FOR MULTICHANNEL FIBER COMMUNICATION NETWORKS, which is hereby incorporated by reference.

BACKGROUND OF THE INVENTION

This invention relates to multichannel fiber optic communication networks, and is more particularly concerned with optical amplifier designs for such networks that provide a substantial cost saving through the use of identical components in amplifiers having different functions within a network.

Optical amplifiers must satisfy a number of rigorous technical requirements in order to assure reliable and accurate communications within a fiber optic network. As such, they typically represent a significant component of the overall network cost. An individual optical amplifier may cost tens of thousands of dollars, and a given network may require a large number of such amplifiers.

Amplifiers for metropolitan area networks (MANs) or metro amplifiers, for example, have special requirements related to operation over multiple wavelength channels, including input and/or output power monitoring, constant output power (constant average gain per channel), gain flatness over a wide wavelength band, and telemetry monitoring (also referred to as supervisory channel monitoring)—all with the need to support significant passive loss. All of these requirements must be met at a relatively high output power and moderate noise figure in order to meet stringent systems requirements.

Traditionally, optical amplifiers have been designed with a particular focus on their location and function within a network—for example, node input amplifier, node output amplifier, or line amplifier—without regard to the other amplifiers in the network. This individualized design approach is a major contributing factor to the high cost of optical amplifiers.

Doped-fiber optical amplifiers utilize lengths of optical fiber doped with an element (rare earth) which can amplify light, the most commonly used of such elements being erbium. Another element receiving considerable attention is praseodymium. The doped fiber is driven or "pumped" with laser light at an appropriate frequency which excites electrons within the fiber to produce a population inversion of electrons between high and low energy states. Photons of light from a data signal supplied to the doped fiber stimulate the excited electrons to release more photons, thereby amplifying the data signal.

Because doped-fiber amplifiers do not amplify all light wavelengths equally (that is, they do not provide a perfectly flat gain spectrum) it is necessary to employ gain flattening filters to flatten the gain spectrum. These filters are designed to minimize gain ripple at a predetermined average inversion of the doped fiber (referring to the average inversion over the length of the fiber) and at a predetermined internal gain of the amplifier (referring to the minimum gain provided by the fiber among the gains for different wavelengths of the system). The process for designing gain flattening filters is time consuming and expensive, and the filters themselves are expensive as well. Gain flattening filters thus represent a substantial component of the cost of multi-channel fiber optic amplifiers.

DISCLOSURE OF THE INVENTION

The present invention, in contrast to the traditional, individualized design approach, is based on an approach which takes amplifiers of different functions into consideration simultaneously. The invention can thus provide a family of multi-channel optical amplifiers that utilize substantially identical components, especially the gain flattening filter, for amplifiers having different functions (e.g., node input amplifier, node output amplifier, and/or line amplifier).

Briefly stated, in accordance with the present invention, amplifiers for different functions and having predetermined net gains are constructed to have total insertion losses such that their respective internal gains (internal gain=net gain+ total insertion loss) can be made substantially the same— that is, as close to each other as practicable, preferably within about 1.5 dB, and more preferably within 1 dB. By so constructing the amplifiers, it becomes possible to use identical gain flattening filters within the different amplifiers without undue degradation of gain flatness.

With amplifier designs as just described, the gain flattening filter may be designed for operation at an internal gain midway between the highest and lowest internal gains (highest and lowest minimum internal gains) of the amplifier family at a predetermined average inversion. In a particular amplifier, therefore, the filter will be operated at an internal gain that can be no more than one half the difference between the highest and lowest internal gains of the amplifier family. Thus, when the internal gains are within the aforementioned range of 1.5 dB, a filter designed for operation at the midpoint of the range would operate at a difference of no more than ±0.75 dB from the design value. More preferably, however, the filter should be operated within ±0.5 dB of its design value, corresponding to the aforementioned 1 dB range, for better gain flatness.

SUMMARY OF THE INVENTION

Briefly stated, in accordance with one of its basic aspects, the present invention provides a multichannel fiber optic communication network, comprising a plurality of nodes interconnected via fiber optic links, at least one of the nodes having a multichannel input optical amplifier and a multichannel output optical amplifier, one of which is connected to a multichannel line amplifier via a fiber optic link of the network, wherein each of at least two of the input, output, and line amplifiers is a doped-fiber amplifier and includes a gain flattening filter, the two amplifiers are constructed to have total insertion losses such that their respective internal gains at a predetermined inversion are substantially the same, and the gain flattening filters of the at least two amplifiers are substantially identical.

According to another basic, but more specific aspect, the present invention provides a multichannel fiber optic communication network, comprising a plurality of nodes interconnected via fiber optic links, at least one of the nodes having a multichannel input optical amplifier and a multichannel output optical amplifier, one of which is connected to a multichannel line amplifier via a fiber optic link of the network, wherein each of at least two of the input, output, and line amplifiers includes first and second doped-fiber gain stages in series and a gain flattening filter intermediate the gain stages, the two amplifiers are constructed to have total insertion losses such that their respective internal gains at a predetermined inversion are substantially the same, and the gain flattening filters of the at least two amplifiers are substantially identical.

BRIEF DESCRIPTION OF THE DRAWINGS

The aforementioned aspects of the invention, as well as its various features and advantages, will be more fully appreciated upon considering the following detailed description of the preferred embodiments in conjunction with the accompanying drawings, in which.

DESCRIPTION OF THE PREFERRED EMBODIMENTS

Figure 1:
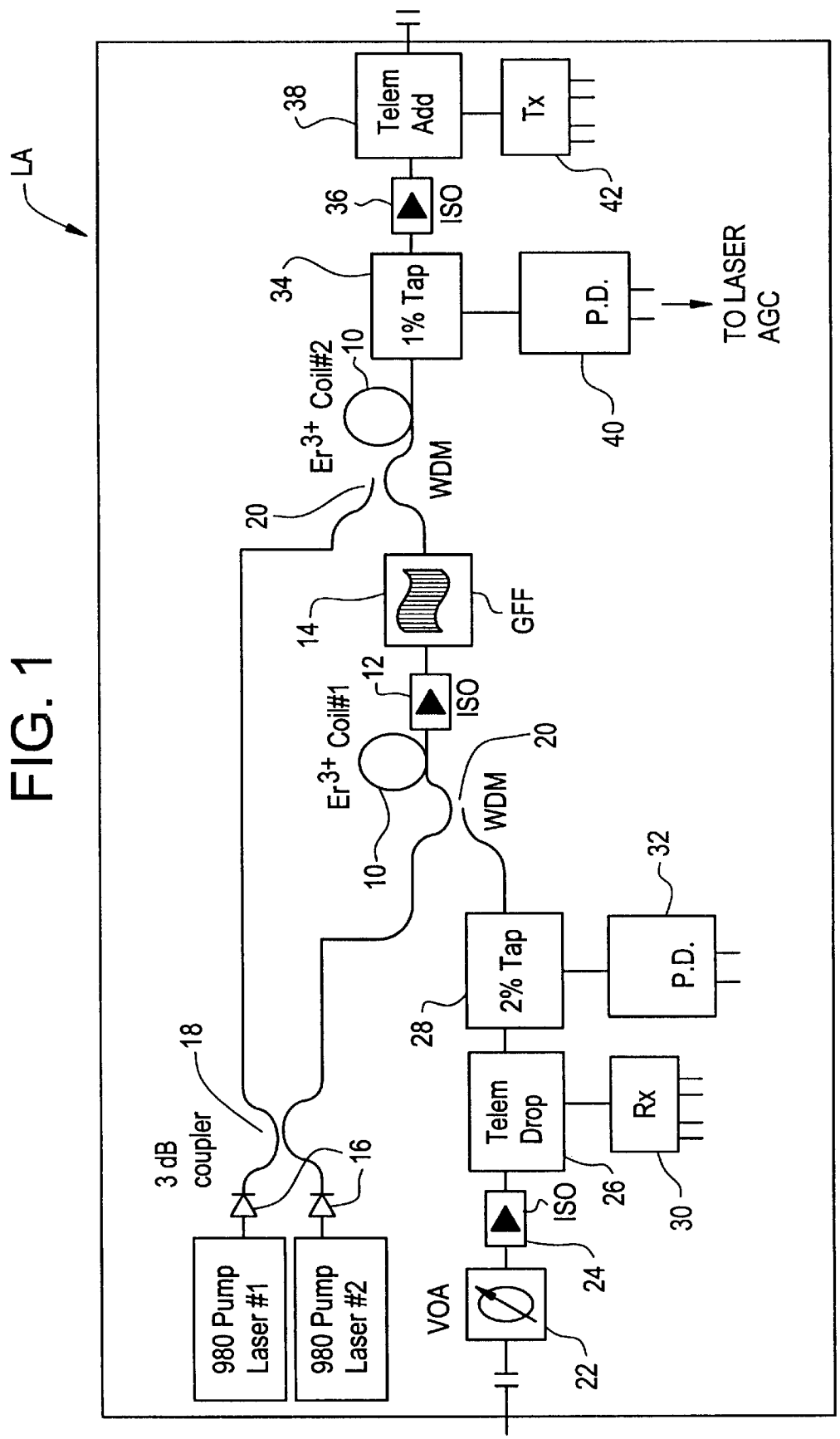
FIGS. 1–3 are diagrammatic illustrations showing a multichannel line amplifier, input amplifier, and output amplifier, respectively, constituting an amplifier family in accordance with the present invention.
Figure 2:
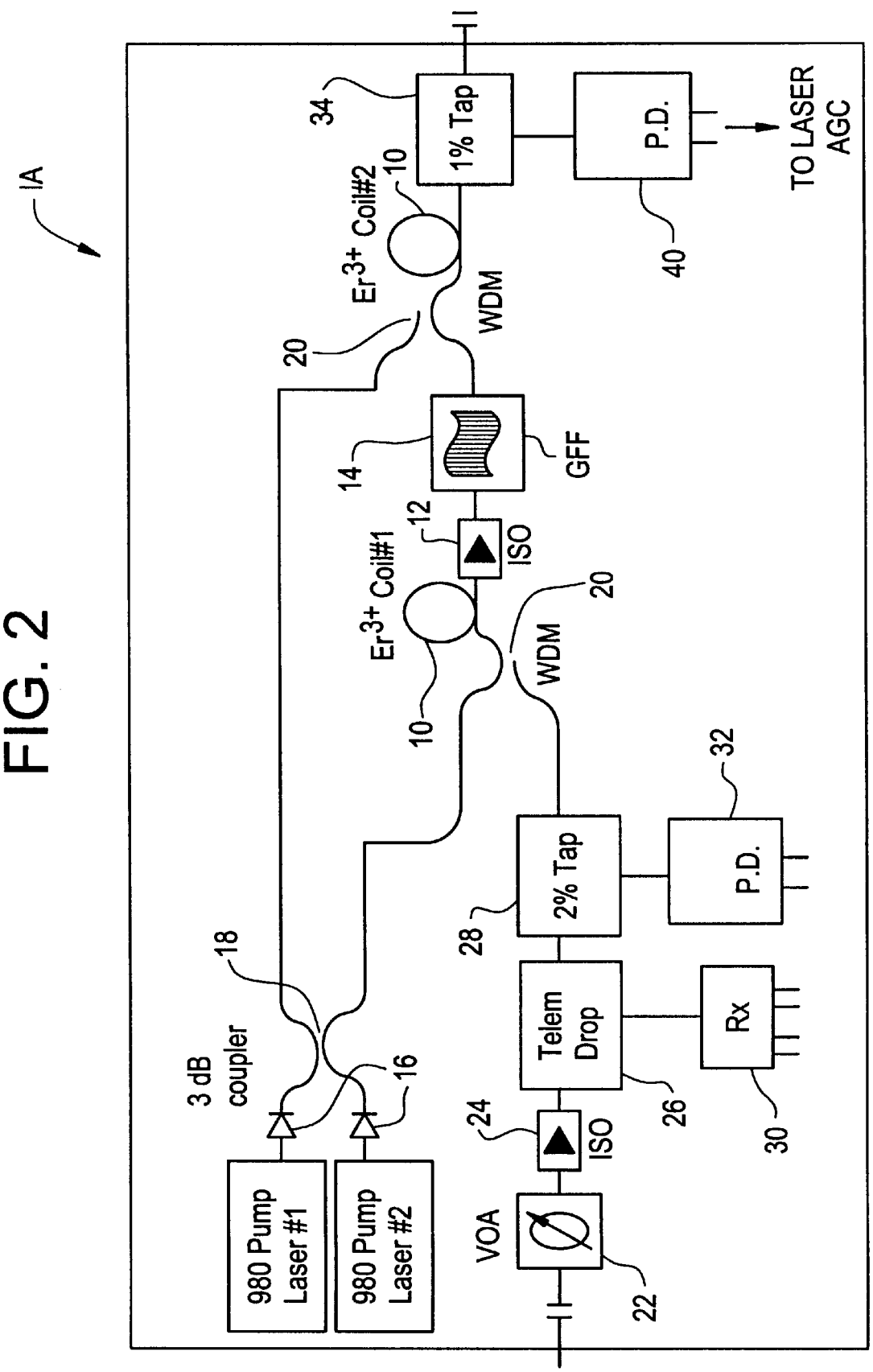
Figure 3:
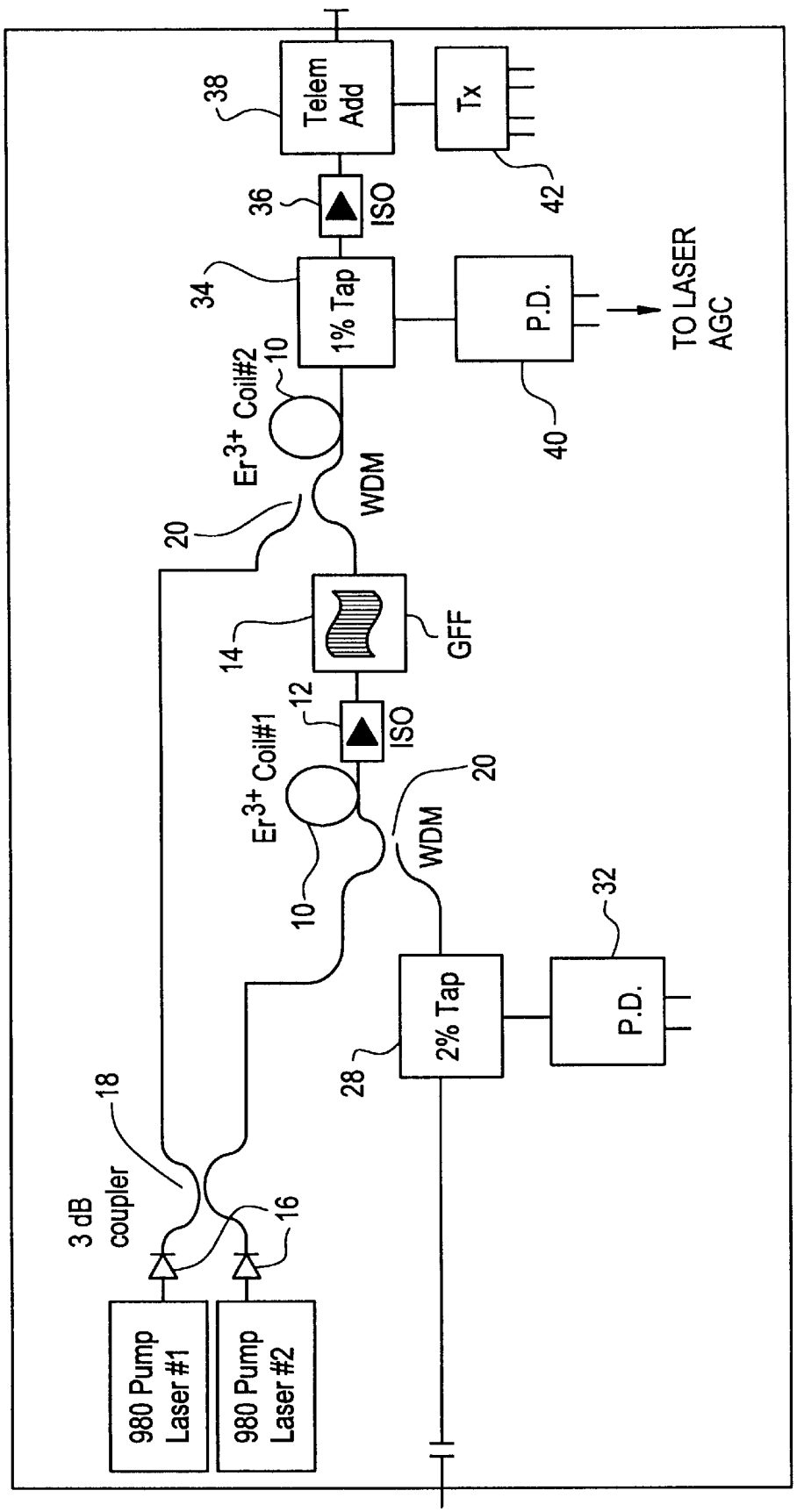

FIGS. 1–3 diagrammatically illustrate a family of multichannel metro amplifiers in accordance with the present invention. The illustrative amplifiers employ erbium-doped fiber amplification, which provides substantial gain for channel wavelengths in a range from about 1530 to about 1560 nm. The number of channels or wavelengths on the network will naturally depend upon the requirements of a particular installation, but a typical network is likely to operate at 16 or 32 channels within the aforementioned wavelength band. It will be understood, of course, that the illustrative amplifier designs are merely exemplary and that the basic principles of the present invention are not limited to MAN applications or to the use of erbium-doped fiber amplification.

FIG. 1 shows the construction of a line amplifier LA. In the form shown, the line amplifier includes two erbium-doped gain stages 10 connected in series by way of an optical isolator 12 and a gain flattening filter 14. The gain stages, which are constituted by respective coils of erbium-doped fiber, are redundantly pumped by a pair of 980 nm laser diodes 16 coupled to the gain stages by a 2×23 dB coupler 18. The outputs of the coupler 18 are coupled to the respective gain stages 10 via WDM (wavelength division multiplex) couplers 20, which combine the pump light with the signal light to be amplified. Although not strictly necessary in the practice of the invention, the dual-pump/dual-gain-stage arrangement just described is advantageous in the MAN context, since it allows for continued operation of the amplifier in a "soft-fail" mode in the event of a failure of one of the pump sources.

The gain flattening filter 14 is preferably of the thin film type. The filter may be transmissive or reflective, although a transmissive filter may be preferred for ease of incorporation into the amplifier structure. Thin film filters offer advantages relative to mass producability, temperature stability, and well-developed packaging. Other types of gain flattening filters which may be used include long period gratings, tapered fiber gratings, and acousto-optic filters.

Ahead of the first gain stage, which is the left gain stage 10 in FIG. 1, the input stage of the amplifier includes a variable optical attenuator 22, an optical isolator 24, a telemetry or supervisory channel drop unit 26, and a 2% power tap 28. The variable optical attenuator operates to compensate for changes in link span loss (such as with temperature) between the amplifier and a previous node or line amplifier in the network, thereby maintaining a substantially constant link span loss ahead of the amplifier. The variable optical attenuator can be controlled by various techniques, as will be appreciated by those skilled in the art. For example, the control may be effected from a central office based on information received over the supervisory channel. The initial setting of the attenuator 22 would be made in accordance with the design link span loss. If desired, the initial setting of the attenuator can have two components, namely, a first component designed to provide a desired insertion loss in the amplifier and a second component determined based on the link span loss. In this way, the attenuator can be used for the combined purposes of providing a desired insertion loss of the amplifier and to compensate changes in link span loss.

The telemetry drop unit 26 extracts the supervisory signal (e.g., a 2 Mbs$^{-1}$ signal at a wavelength slightly out of the communication band) from the signal input to the amplifier. The extracted signal is input to a receiver 30, the output of which can be supplied to the network central office by suitable means. Supervisory monitoring techniques are known in the art and therefore will not be addressed further herein.

The 2% power tap 28 has its monitor output connected to a photodetecting unit 32 which detects the power level of the input signal to the amplifier. The power level may be indicated by photodiodes within the unit, which are driven in accordance with the power monitor signal. The output of the photodetecting unit may be used to generate an alarm in the event of a system fault, for example. It may also be used as a parameter for controlling pump power in order to control the output power of the amplifier to a constant level.

While the arrangement of the input stage components may be changed from that shown in FIG. 1, the illustrative arrangement, with the variable optical attenuator ahead of the telemetry channel drop unit 26 and power tap 28 is advantageous to achieve a near constant power on the telemetry channel drop unit and input power monitor photodiodes. This permits greater ease in linearization of the photodiodes and improved bit error rate performance of the telemetry channel drop signal because of the near constant power on these components despite varying link span losses.

Beyond the second gain stage of the amplifier, the output stage includes a 1% power tap 34, an optical isolator 36, and a telemetry or supervisory channel add unit 38, which are connected in series with the output of the second gain stage, preferably in the order shown. The monitor output of the 1% tap unit is supplied to a photodetecting unit 40, the output of which is coupled to an electrical automatic gain controller, as indicated, to control the pump lasers 16 so as to maintain a substantially constant output power level of the amplifier.

The telemetry add unit 38 combines a supervisory signal supplied from a transmitter 42 with the communication signal for transmission to the next amplifier in sequence, which may be another line amplifier or a node input amplifier.

FIG. 2 shows the construction of the node input amplifier IA. This amplifier has the same basic construction as the line amplifier shown in FIG. 1, except that the output stage does not include the optical isolator 36 or the telemetry add unit 38 and its associated transmitter 42. These components are unnecessary since the input amplifier does not have its output connected directly to another fiber optic link of the network.

FIG. 3 shows the output amplifier OA. The construction of this amplifier is basically the same as that of the line amplifier in FIG. 1, except that the input stage does not include the variable optical attenuator 22, the optical isolator 24, or the telemetry drop unit 26 and its associated receiver 30. These components are unnecessary since the input stage is not connected directly to a fiber link of the network.

Figure 7:
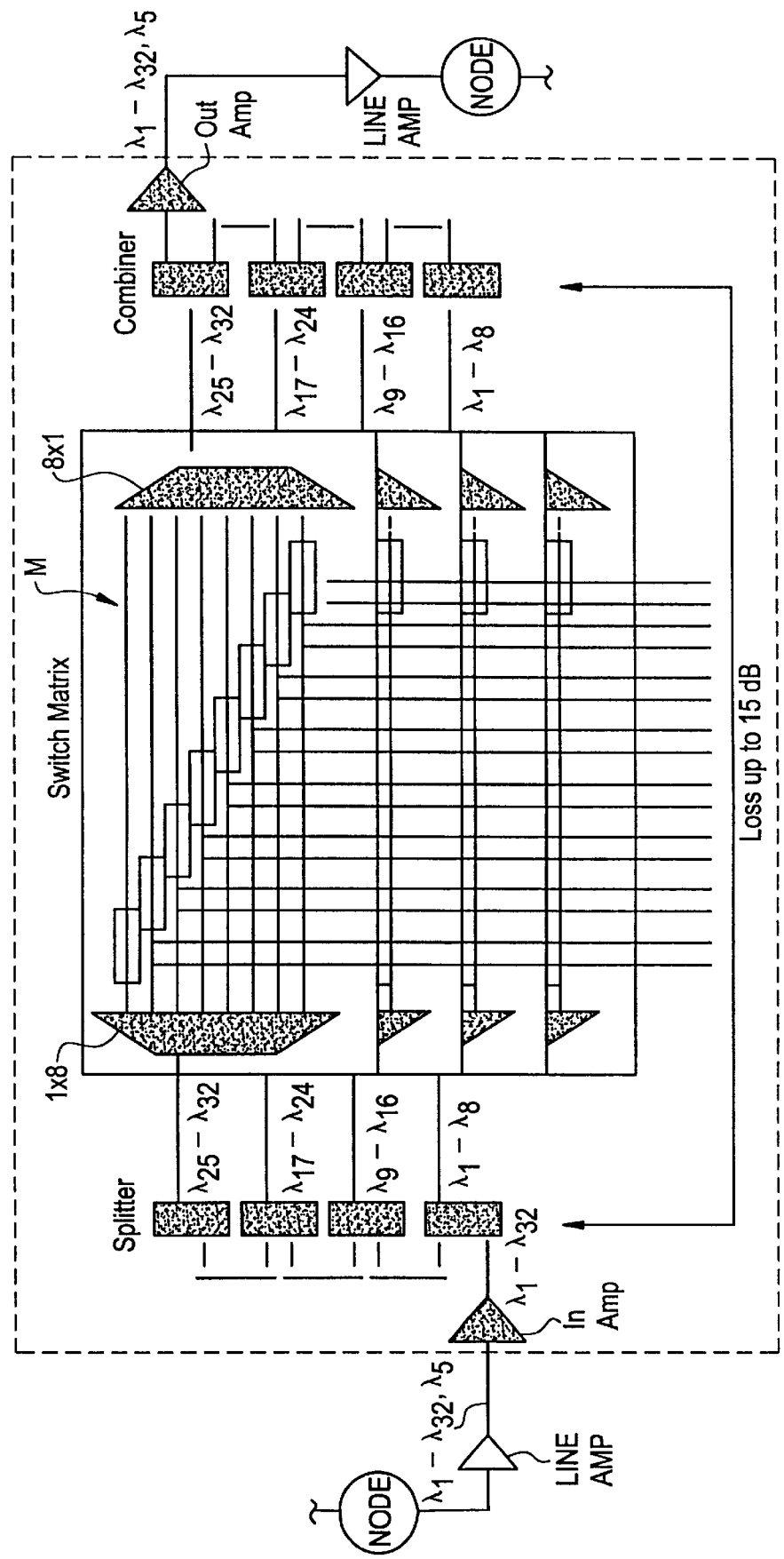
FIG. 7 is a diagrammatic illustration showing a 32-channel wavelength add/drop network node incorporating the input and output amplifiers of FIGS. 2 and 3.

FIG. 7 is a diagram depicting how the amplifiers of FIGS. 1–3 can be incorporated in a metropolitan area network (MAN) having 32 communication channels or wavelengths $\lambda 1$–$\lambda 32$ and a supervisory channel $\lambda S$. FIG. 7 shows an exemplary node N which includes an input amplifier and an output amplifier coupled via a splitter arrangement, a set of four wavelength add/drop multiplexers (which constitute a switch matrix), and a combiner arrangement. Each of the input and output amplifiers is linked to another node of the network via a line amplifier, as shown. For two-way communication, the node also includes an identical arrangement (not shown) having an opposite transmission direction and coupled to the other nodes via two additional fiber links and line amplifiers (not shown).

All of the signal channels $\lambda 1$–$\lambda 32$ and the supervisory channel $\lambda S$ are input by the input amplifier of the node. The input amplifier extracts the supervisory channel as previously described and outputs the amplified channel signals $\lambda 1$–$\lambda 32$ to the splitter arrangement. The splitter arrangement splits the channels into four wavelength bands $\lambda 1$–$\lambda 8$, $\lambda 9$–$\lambda 16$, $\lambda 17$–$\lambda 24$, and $\lambda 25$–$\lambda 32$ which are input to respective wavelength add/drop multiplexers, only one of which (designated M) is fully illustrated in FIG. 7 for the sake of convenience. Each of the wavelength add/drop multiplexers includes a 1×8 demultiplexer which demultiplexes the signals of the corresponding wavelength band and passes them through a corresponding set of switches which may be configured either to pass the corresponding channel signal undisturbed or to extract it and replace it with a different signal on the same wavelength. The signals from the switches are input to an 8×1 multiplexer which recombines the signals. The outputs of the multiplexers are passed to a combiner arrangement which recombines the four wavelength bands and outputs them together to the output amplifier, where they are amplified and supplemented with the supervisory signal for transmission to the next node.

EXAMPLES

Tables 1–3 show design parameters of the metro amplifiers in FIGS. 1–3 for application in a MAN as shown in FIG. 7. These designs were tested by computer simulation for operation at 16 and 32 channels at an effective average inversion N2=0.65. All components of the amplifiers represented in the tables are commercially available components with the exception of the gain flattening filter (which had to be designed for this particular application), and they were selected to provide appropriate insertion losses such that the internal gains of the amplifiers would be within a range of 1 dB.

The coil lengths of the individual gain stages can be set to obtain the best balance of gain flatness (given a particular gain flattening filter), noise figure, and pump power. Appropriate lengths can be determined empirically or by simulation. In the illustrative examples, it was determined that the first stage coil should be approximately 0.55 of the total length of the two coils.

Table 4 shows the design parameters for the gain flattening filter, which is preferably a transmissive, thin film type filter as noted earlier. As shown in Table 4, the gain flattening filter was designed for operation at 17.92 dB, which is the midpoint between the internal gains of the input and output amplifiers.

Tables 5 and 6 show the simulation results. For purposes of the simulation, the following conditions were taken to apply:

1. Insertion loss values of all components and splices are manufacturing mean values indicated in Tables 1–3.

2. Total signal input power is evenly distributed over the 32 channels at the input of the input amplifier and the line amplifier for 32 channel operation. For 16 channel operation, the total signal input power is evenly distributed over 16 channels within the 1545–1560 nm spectral band.

3. Computed pump power values take into account the penalty incurred due to pump connectors (0.5 dB) and the 3 dB soft-fail coupler insertion losses (0.2 dB excess).

4. Average inversion N2=0.65.

TABLE 1

Power Budget: two stages Line Amplifier with Electrical AGC (13 dB Net Gain)
Target Net Gain (dB) 13

| | Passive Loss (dB) | | |
|---|---|---|---|
| | mean | σ | Mean + σ |
| Input loss | | | |
| Connector | −0.15 | 0.1 | −0.25 |
| Splice: smf-smf | −0.03 | 0.03 | −0.06 |
| Isolator | −0.4 | 0.03 | −0.43 |
| Splice: smf-smf | −0.03 | 0.03 | −0.06 |
| VOA | −1 | 0.5 | −1.5 |
| Splice: smf-smf | −0.03 | 0.03 | −0.06 |
| SC. drop | −0.35 | 0.12 | −0.47 |
| Splice: smf-smf | −0.03 | 0.03 | −0.06 |
| 2% tap | −0.18 | 0.03 | −0.21 |
| Splice: smf-smf | −0.03 | 0.03 | −0.06 |
| 980/1550 wdm | −0.28 | 0.05 | −0.33 |
| Splice: G3-Er | −0.06 | 0.03 | −0.09 |
| total input loss | −2.57 | 1.01 | −3.58 |
| Interstage loss | | | |
| Splice: Er-smf | −0.2 | 0.03 | −0.23 |
| Isolator | −0.4 | 0.03 | −0.43 |
| Splice: smf-smf | −0.03 | 0.03 | −0.06 |
| GFF excess loss | −0.5 | 0.3 | −0.8 |
| Splice: smf-smf | −0.03 | 0.03 | −0.06 |
| 980/1550 wdm | −0.28 | 0.05 | −0.33 |
| Splice: G3-Er | −0.06 | 0.03 | −0.09 |
| total intestage loss | −1.5 | 0.5 | −2 |
| Output loss | | | |
| Splice: Er-smf | −0.2 | 0.03 | −0.23 |
| 1% tap | −0.13 | 0.03 | −0.16 |
| Splice: smf-smf | −0.03 | 0.03 | −0.06 |
| SC. Add | −0.43 | 0.08 | −0.51 |
| Splice: smf-smf | −0.03 | 0.03 | −0.06 |
| Isolator | −0.4 | 0.03 | −0.43 |
| total output loss | −1.22 | 0.23 | −1.45 |
| Total passive loss | −5.29 | 1.74 | −7.03 |
| Total Erbium gain | 18.29 | | 20.03 |

TABLE 1-continued

Power Budget Summary

| | Passive Loss (d Power/ch (dBm)) | | Power/chan (dBm) | |
|---|---|---|---|---|
| | mean | Mean + σ | mean | Mean + σ |
| Input power/ch | | | −13 | −13 |
| Input. Loss | −2.57 | −3.58 | −15.57 | −16.58 |
| interstage loss | −1.5 | −2 | −17.07 | −18.58 |
| Output loss | −1.22 | −1.45 | −18.29 | −20.03 |
| Er coil gain | 18.29 | 20.03 | 0 | 0 |

σ = 1 standard deviation

TABLE 2

Power Budget: two stages Input Amplifier with Electrical AGC (14 dB Net Gain) Target Net Gain (dB) 14

| | Passive Loss (dB) | | |
|---|---|---|---|
| | mean | σ | Mean + σ |
| Input loss | | | |
| Connector | −0.15 | 0.1 | −0.25 |
| Splice: smf-smf | −0.03 | 0.03 | −0.06 |
| Isolator | −0.4 | 0.03 | −0.43 |
| Splice: smf-smf | −0.03 | 0.03 | −0.06 |
| VOA | −1 | 0.5 | −1.5 |
| Splice: smf-smf | −0.03 | 0.03 | −0.06 |
| SC. drop | −0.35 | 0.12 | −0.47 |
| Splice: smf-smf | −0.03 | 0.03 | −0.06 |
| 2% tap | −0.18 | 0.03 | −0.21 |
| Splice: smf-smf | −0.03 | 0.03 | −0.06 |
| 980/1550 wdm | −0.28 | 0.05 | −0.33 |
| Splice: G3-Er | −0.06 | 0.03 | −0.09 |
| total input loss | −2.57 | 1.01 | −3.58 |
| Interstage loss | | | |
| Splice: Er-smf | −0.2 | 0.03 | −0.23 |
| Isolator | −0.4 | 0.03 | −0.43 |
| Splice: smf-smf | −0.03 | 0.03 | −0.06 |
| GFF excess loss | −0.5 | 0.3 | −0.8 |
| Splice: smf-smf | −0.03 | 0.03 | −0.06 |
| 980/1550 wdm | −0.28 | 0.05 | −0.33 |
| Splice: G3-Er | −0.06 | 0.03 | −0.09 |
| total intestage loss | −1.5 | 0.5 | −2 |
| Output loss | | | |
| Splice: Er-smf | −0.2 | 0.03 | −0.23 |
| 1% tap | −0.13 | 0.03 | −0.16 |
| total output loss | −0.33 | 0.06 | −0.39 |
| Total passive loss | −4.4 | 1.57 | −5.97 |
| Total Erbium gain | 18.4 | | 19.97 |

Power Budget Summary

| | Passive Loss (d Power/ch (dBm)) | | Power/chan (dBm) | |
|---|---|---|---|---|
| | mean | Mean + σ | mean | Mean + σ |
| Input power/ch | | | −13 | −13 |
| Input. Loss | −2.57 | −3.58 | −15.57 | −16.58 |
| interstage loss | −1.5 | −2 | −17.07 | −18.58 |
| Output loss | −0.33 | −0.39 | −17.4 | −18.97 |
| Er coil gain | 18.4 | 19.97 | 1 | 1 |

σ = 1 standard deviation

TABLE 3

Power Budget: two stages output Amplifier with Electrical AGC (14 dB Net Gain) Target Net Gain (dB) 14

| | Passive Loss (dB) | | |
|---|---|---|---|
| | mean | σ | Mean + σ |
| Input loss | | | |
| Connector | −0.15 | 0.1 | −0.25 |
| Splice: smf-smf | −0.03 | 0.03 | −0.06 |
| 2% tap | −0.18 | 0.03 | −0.21 |
| Splice: smf-smf | −0.03 | 0.03 | −0.06 |
| 980/1550 wdm | −0.28 | 0.05 | −0.33 |
| Splice: G3-Er | −0.06 | 0.03 | −0.09 |
| total input loss | −0.73 | 0.27 | −1 |
| Interstage loss | | | |
| Splice: Er-smf | −0.2 | 0.03 | −0.23 |
| Isolator | −0.4 | 0.03 | −0.43 |
| Splice: smf-smf | −0.03 | 0.03 | −0.06 |
| GFF excess loss | −0.5 | 0.3 | −0.8 |
| Splice: smf-smf | −0.03 | 0.03 | −0.06 |
| 980/1550 wdm | −0.28 | 0.05 | −0.33 |
| Splice: G3-Er | −0.06 | 0.03 | −0.09 |
| total intestage loss | −1.5 | 0.5 | −2 |
| Output loss | | | |
| Splice: Er-smf | −0.2 | 0.03 | −0.23 |
| 1% tap | −0.13 | 0.03 | −0.16 |
| Splice: smf-smf | −0.03 | 0.03 | −0.06 |
| SC. Add | −0.43 | 0.08 | −0.51 |
| Splice: smf-smf | −0.03 | 0.03 | −0.06 |
| Isolator | −0.4 | 0.03 | −0.43 |
| total output loss | −1.22 | 0.23 | −1.45 |
| Total passive loss | −3.45 | 1 | −4.45 |
| Total Erbium gain | 17.45 | | 18.45 |

Power Budget Summary

| | Passive Loss (d Power/ch (dBm)) | | Power/chan (dBm) | |
|---|---|---|---|---|
| | mean | Mean + σ | mean | Mean + σ |
| Input power/ch | | | −14 | −14 |
| Input. Loss | −0.73 | −1 | −14.73 | −15 |
| interstage loss | −1.5 | −2 | −16.23 | −17 |
| Output loss | −1.22 | −1.45 | −17.45 | −18.45 |
| Er coil gain | 17.45 | 18.45 | 0 | 0 |

σ = 1 standard deviation

TABLE 4

| Total Erbium Length (m) | 13.7586 |
| Effective average inv N2 | 0.65 |
| Minimum Internal Gain (dB) | 17.92 |

| Wavelength | g_eff | alpha_eff | Gain coefficient (dB/m) | Erbium Gain (dB) |
|---|---|---|---|---|
| 1559.79 | 4.959068 | 1.1685 | 1.41645339 | 19.48842267 |
| 1558.98 | 5.013559 | 1.18 | 1.430677966 | 19.68413299 |
| 1558.17 | 5.127203 | 1.1805 | 1.436860169 | 19.76919149 |
| 1557.36 | 5.232797 | 1.1836 | 1.445139831 | 19.88310807 |
| 1556.55 | 5.337119 | 1.179 | 1.445855932 | 19.89296064 |
| 1555.75 | 5.366441 | 1.182 | 1.450322034 | 19.95440796 |
| 1554.94 | 5.44339 | 1.176 | 1.448169492 | 19.92479198 |
| 1554.13 | 5.547288 | 1.169 | 1.446364407 | 19.89995654 |

TABLE 4-continued

| | | | | |
|---|---|---|---|---|
| 1551.72 | 5.733138 | 1.1555 | 1.44215678 | 19.84206546 |
| 1550.92 | 5.802034 | 1.152 | 1.442101695 | 19.84130757 |
| 1550.12 | 5.850085 | 1.1455 | 1.438004237 | 19.78493227 |
| 1549.32 | 5.94161 | 1.1355 | 1.432580508 | 19.71030932 |
| 1548.51 | 6.024661 | 1.1255 | 1.426733051 | 19.62985646 |
| 1547.72 | 6.053814 | 1.1175 | 1.420190678 | 19.53984254 |
| 1546.92 | 6.084068 | 1.106 | 1.41020339 | 19.40243139 |
| 1546.12 | 6.212542 | 1.094 | 1.404627119 | 19.32570968 |
| 1543.73 | 6.387881 | 1.0485 | 1.367894068 | 18.82031414 |
| 1542.94 | 6.431186 | 1.034 | 1.355559322 | 18.65060524 |
| 1542.14 | 6.462119 | 1.0165 | 1.339605932 | 18.43110886 |
| 1541.35 | 6.518898 | 1.0015 | 1.327444915 | 18.26379023 |
| 1540.56 | 6.580678 | 0.986 | 1.315033898 | 18.09303195 |
| 1538.77 | 6.677881 | 0.9695 | 1.303394068 | 17.93288412 |
| 1538.98 | 6.849153 | 0.96 | 1.302457627 | 17.92 |
| 1538.19 | 6.985169 | 0.9625 | 1.311758475 | 18.04796669 |
| 1535.82 | 8.137288 | 1.01 | 1.416864407 | 19.49407769 |
| 1535.04 | 8.553051 | 1.043 | 1.470652542 | 20.2341274 |
| 1534.25 | 9.07661 | 1.072 | 1.525830508 | 20.99329924 |
| 1533.47 | 9.481356 | 1.09 | 1.564067797 | 21.51939098 |
| 1532.68 | 9.769915 | 1.0925 | 1.580995763 | 21.75229618 |
| 1531.9 | 10.01551 | 1.0815 | 1.582275424 | 21.76990253 |
| 1531.12 | 10.14034 | 1.058 | 1.565016949 | 21.53245 |
| 1530.33 | 10.17678 | 1.023 | 1.531838983 | 21.07596747 |
| | 4.959068 | | 1.302457627 | 17.92 |
| | | | | 21.76990253 |
| | | | Gain Riple (dB) | 3.849902531 |

*(2) The fiber length is appropriate for Corning Er2128(5-2128-202).
**Wavelength values are defined in vacuum
***g_eff and alpha_eff are effective Giles like parameters. But rigorously these are not strictly equivalent to g* and alpha usually defined. These parameters have been derived using the 5+ probe technique to mimic a 32 channels loading configuration.

TABLE 5

16 Channels

| | Internal Gain (dB) | Total Insertion Loss* (dB) | N2 | Pump power/ laser** (mw) | Total Output Power (dBm) | Pout min (dBm/ch) | NF* (dB) |
|---|---|---|---|---|---|---|---|
| 14 dB input amp. | 18.40 | 4.40 | 0.65 | 44 | 13 | 1 | <7.6 |
| 14 dB output amp. | 17.45 | 3.45 | 0.65 | 43 | 12 | 0 | <4.8 |
| 13 dB Line amp. | 18.29 | 5.29 | 0.65 | 43 | 12 | 0 | <6.5 |

*Including VOA and Gain flattening filter insertion losses
**Pump power values include pump connector loss (0.5 dB) and the 3 dB soft fail coupler

TABLE 6

32 Channels

| | Internal Gain (dB) | Total Insertion Loss* (dB) | N2 | Pump power/ laser** (mw) | Total Output Power (dBm) | Pout min (dBm/ch) | NF* (dB) |
|---|---|---|---|---|---|---|---|
| 14 dB input amp. | 18.40 | 4.40 | 0.65 | 79 | 16 | 1 | <6.6 |
| 14 dB output amp. | 17.45 | 3.45 | 0.65 | 77 | 15 | 0 | <4.9 |
| 13 dB Line amp. | 18.29 | 5.29 | 0.65 | 77 | 15 | 0 | <6.6 |

*Including VOA and Gain flattening filter insertion losses
**Pump power values include pump connector loss (0.5 dB) and the 3 dB soft fail coupler Amplifiers as shown in FIGS. 1–3, but without variable optical attenuators, were constructed and tested for gain flatness. The amplifiers were built using components that were readily available in-house. As a result, the total insertion losses shown in Tables 1–3 were not attained. The erbium gains therefore had to be adjusted slightly from the values shown in Tables 1–3, but they were still within a small range (0.61 dB). See Table 7. For purposes of the test, a gain flattening filter that had been constructed on the basis of Table 4 was used. Although this filter does not represent the optimum design value for use with the amplifiers of this experiment, good gain flatness was nonetheless achieved.

TABLE 7

| Ref. Amp | IL tot (dB) | G net | G int |
|---|---|---|---|
| Input amp. | 4.21 | 14 | 18.21 |
| Output amp. | 4.44 | 14 | 18.44 |
| Line amp. | 5.82 | 13 | 18.82 |

Figure 4:
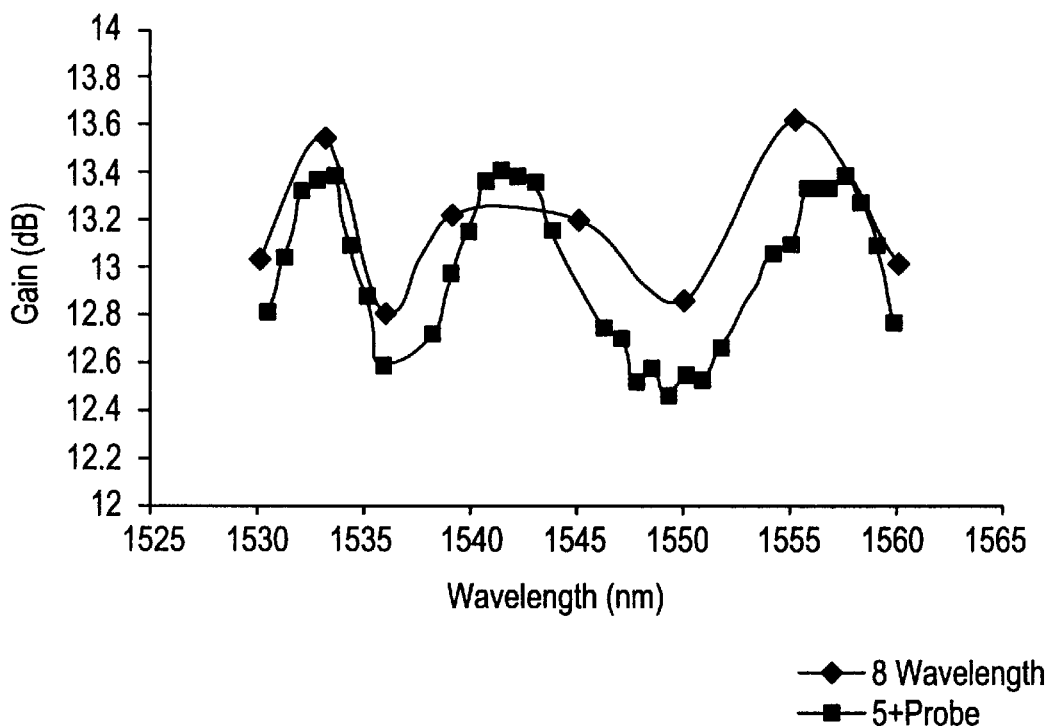
FIGS. 4–6 are plots showing measured gain flatnesses of a line amplifier, an input amplifier, and an output amplifier, respectively, constructed in accordance with the invention.
Figure 5:
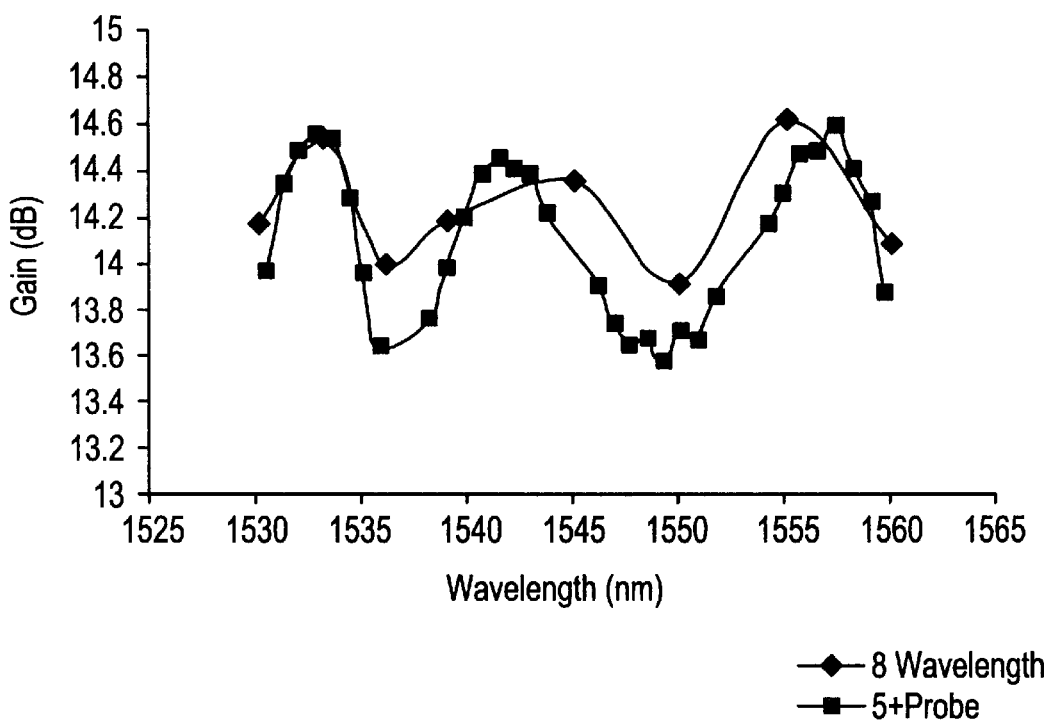
Figure 6:
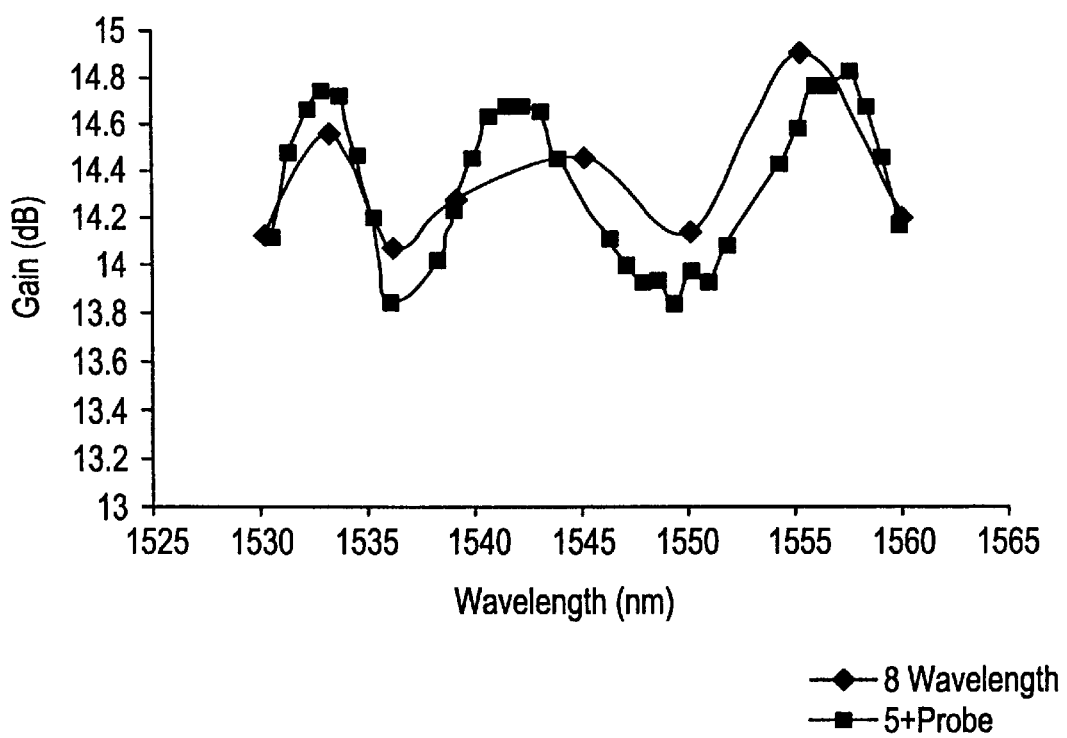

The gain flatness of the amplifiers was tested by two techniques. The first technique (8 wavelength) involved passing eight wavelengths through the amplifier at wavelength values selected in correspondence with values where potential slopes in the gain might be expected. The second technique (5+1 probe) involved loading the amplifier with five wavelength signals having a total power close to the total input power for normal operation. The wavelength values were selected to be within the operation wavelength band of the amplifiers, but not at channel wavelengths. An additional signal was applied to the amplifier and selectively set at each of the channel wavelengths. The results are shown in FIGS. 4–6.

As will be appreciated by those skilled in the art, the invention is not limited to the preferred embodiments described above, and numerous variations are possible in keeping with the basic principles of the invention, the scope of the invention being defined in the appended claims.

The invention claimed is:

1. A multichannel fiber optic communication network, comprising a plurality of nodes interconnected via fiber optic links, at least one of said nodes having a multichannel input optical amplifier and a multichannel output optical amplifier, one of which is connected to a multichannel line amplifier via a fiber optic link of the network, wherein each of at least two of said input, output, and line amplifiers includes first and second doped-fiber gain stages in series and a gain flattening filter intermediate the gain stages, said two amplifiers are constructed to have total insertion losses such that their respective internal gains at a predetermined inversion (internal gain=net gain+total insertion loss) are substantially the same, and the gain flattening filters of said at least two amplifiers are substantially identical.

2. A multichannel fiber optic communication network according to claim 1, wherein said two amplifiers are constituted by the input and output amplifiers.

3. A multichannel fiber optic communication network according to claim 2, wherein the net gains of said two amplifiers are equal and their internal gains are within 1 dB of each other at the predetermined inversion.

4. A multichannel fiber optic communication network according to claim 2, wherein said two amplifiers have gain flatness $\leq 1$ dB at the predetermined inversion.

5. A multichannel fiber optic communication network according to claim 2, wherein an input stage of said input amplifier has components including an optical isolator, a supervisory channel drop unit, and a power tap.

6. A multichannel fiber optic communication network according to claim 5, wherein said input stage further includes a compensator component that compensates for changes in link span loss.

7. A multichannel fiber optic communication network according to claim 6, wherein said compensator component is a variable optical attenuator.

8. A multichannel fiber optic communication network according to claim 7, wherein the aforementioned components are arranged in the following order in a direction of channel transmission through the input amplifier: variable optical attenuator, optical isolator, supervisory channel drop unit, power tap.

9. A multichannel fiber optic communication network according to claim 5, wherein an output stage of said output amplifier has components including an optical isolator, a power tap, and a supervisory channel add unit.

10. A multichannel fiber optic communication network according to claim 9, wherein said components are arranged in the named order in a direction of channel transmission through the output amplifier.

11. A multichannel fiber optic communication network according to claim 1, wherein said two amplifiers are constituted by the line amplifier and one of said input and output amplifiers.

12. A multichannel fiber optic communication network according to claim 11, wherein the net gains of said two amplifiers are within 1 dB of each other and their internal gains are within 1 dB of each other, at the predetermined inversion.

13. A multichannel fiber optic communication network according to claim 11, wherein said two amplifiers have gain flatness $\leq 1$ dB at the predetermined inversion.

14. A multichannel fiber optic communication network according to claim 11, wherein said two amplifiers are constituted by said line amplifier and said input amplifier, and each of said line amplifier and said input amplifier has an input stage including the following components: an optical isolator, a supervisory channel drop unit, and a power tap.

15. A multichannel fiber optic communication network according to claim 14, wherein the input stage of said input amplifier further includes a compensator component that compensates for changes in link span loss.

16. A multichannel fiber optic communication network according to claim 15, wherein said compensator component is a variable optical attenuator.

17. A multichannel fiber optic communication network according to claim 16, wherein the aforementioned components are arranged in the following order in a direction of channel transmission through said input amplifier: variable optical attenuator, optical isolator, supervisory channel drop unit, power tap.

18. A multichannel fiber optic communication network according to claim 11, wherein said two amplifiers are constituted by said line amplifier and said output amplifier, and each of said line amplifier and said output amplifier has an output stage including the following components: an optical isolator, a power tap, and a supervisory channel add unit.

19. A multichannel fiber optic communication network according to claim 18, wherein the optical isolator, power tap, and supervisory channel add unit are arranged in the named order in a direction of channel transmission through the corresponding amplifier.

20. A multichannel fiber optic communication network according to claim 1, wherein each of said two amplifiers includes a plurality of pump sources coupled to its first and second gain stages to provide pump redundancy for those gain stages.

21. A multichannel fiber optic communication network according to claim 20, wherein the pump sources are coupled to the gain stages via a 3 dB coupler.

22. A multichannel fiber optic communication network according to claim 21, wherein each of said two amplifiers includes a power tap in an output stage thereof, with or without a power tap in an input stage thereof.

23. A multichannel fiber optic communication network according to claim 2, wherein said one node comprises a splitter arrangement that splits an output signal from said input amplifier into a plurality of wavelength bands and inputs at least one of said wavelength bands into a 1×N wavelength demultiplexer coupled to an N×1 wavelength multiplexer which outputs said wavelength band to a combiner arrangement that recombines the wavelength bands and inputs them to the output amplifier.

24. A multichannel fiber optic communication network according to claim 2, wherein said input and output amplifiers are coupled via at least one wavelength add/drop multiplexer.

25. A multichannel fiber optic communication network according to claim 2, wherein said one node includes a splitter arrangement that splits an output signal of said input amplifier into a plurality of wavelength bands and inputs each of said wavelength bands into a corresponding wavelength add/drop multiplexer which outputs the corresponding wavelength band to a combiner arrangement that recombines the wavelength bands and inputs them to said output amplifier.

26. A multichannel fiber optic communication network according to claim 1, wherein the channels of the network are in a spectral region from about 1530 nm to about 1560 nm, and said first and second gain stages of each of said at least two amplifiers are erbium doped.

27. A multichannel fiber optic communication network according to claim 1, wherein the internal gains of said at least two amplifiers are within 1.5 dB.

28. A multichannel fiber optic communication network according to claim 27, wherein the internal gains of said at least two amplifiers are within 1 dB.

29. A multichannel fiber optic communication network, comprising a plurality of nodes interconnected via fiber optic links, at least one of said nodes having a multichannel input optical amplifier and a multichannel output optical amplifier, one of which is connected to a multichannel line amplifier via a fiber optic link of the network, wherein each of at least two of said input, output, and line amplifiers is a doped-fiber amplifier and includes a gain flattening filter, said two amplifiers are constructed to have total insertion losses such that their respective internal gains at a predetermined inversion (internal gain=net gain+total insertion loss) are substantially the same, and the gain flattening filters of said at least two amplifiers are substantially identical.

\* \* \* \* \*